United States Patent [19]
Scaramucci

[11] Patent Number: 5,323,805
[45] Date of Patent: Jun. 28, 1994

[54] VALVE WITH SAFETY LOCK-OUT

[75] Inventor: John P. Scaramucci, Oklahoma City, Okla.

[73] Assignee: Balon Corporation, Oklahoma City, Okla.

[21] Appl. No.: 132,588

[22] Filed: Oct. 6, 1993

[51] Int. Cl.$^5$ ............................................. F16K 35/02
[52] U.S. Cl. .................... 137/385; 137/382; 251/286
[58] Field of Search ................ 251/286, 288; 137/385; 70/177, 180

[56] References Cited

U.S. PATENT DOCUMENTS

| | | | |
|---|---|---|---|
| 2,913,219 | 11/1959 | Freed | 251/288 |
| 3,401,715 | 9/1968 | Johnson et al. | 137/385 |
| 3,743,243 | 7/1973 | Scaramucci | 251/288 |
| 3,865,130 | 2/1975 | Mullis | 137/385 |
| 3,960,168 | 6/1976 | Plympton | 137/385 |
| 3,976,095 | 8/1976 | Koch et al. | 137/385 |
| 4,193,579 | 3/1980 | Massey | 251/288 |
| 5,014,528 | 5/1991 | Roberts | 251/288 |
| 5,052,655 | 10/1991 | Ackroyd | 137/385 |

OTHER PUBLICATIONS

"Series L Ball Valve—The Economical, Low-pressure-sealing Ball Valve From DEMCO", Cooper Industries. (date unknown).
"Parts Lists", Texsteam Inc. Super 'G' Catalog. (date unknown).
"Accessories", W-K ∝ M Catalog B. (date unknown).
"Watts Regulator Ball Valves For Compressed Air Services". (date unknown).
"Series E Ball Valve—2", 3" & 4" 600 psi CWP". (Oct. 14, 1986).
"Kim Industries Ball Valve Catalog". (date unknown).
"Just Out and . . . Outstanding! Tri Pac 525", Marpac. (date unknown).

Primary Examiner—A. Michael Chambers
Attorney, Agent, or Firm—Dunlap, Codding & Lee

[57] ABSTRACT

A valve, such as a ball valve, which is turned 90° between a fully open and a fully closed position. A lockout plate is secured on the valve stem and has at least one lock-out opening positioned to mate with a lock-out opening in either an indexing plate or the valve body, such that the valve may be securely locked in a fully closed position. An indexing plate may also be used to fit on the valve stem and cooperate with flat surfaces on the valve stem for limiting the turning movement of the valve to fully open and fully closed positions.

17 Claims, 5 Drawing Sheets

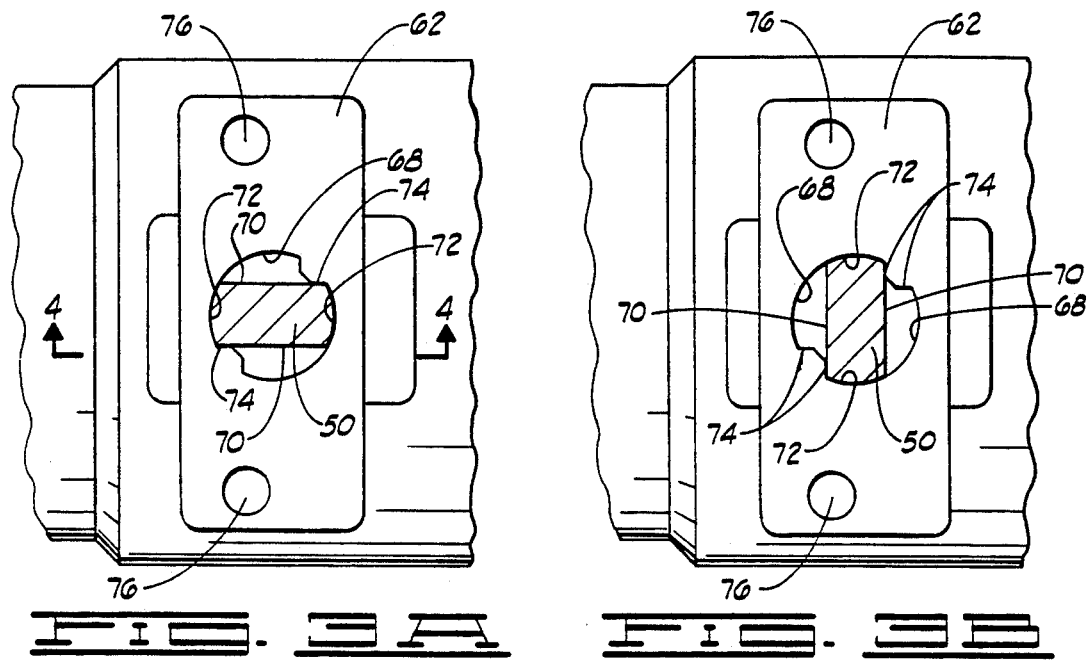
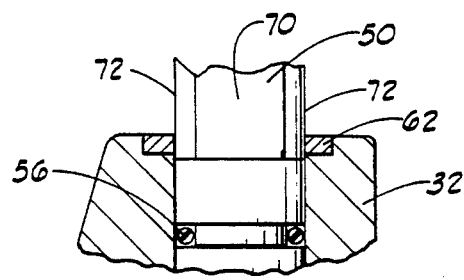
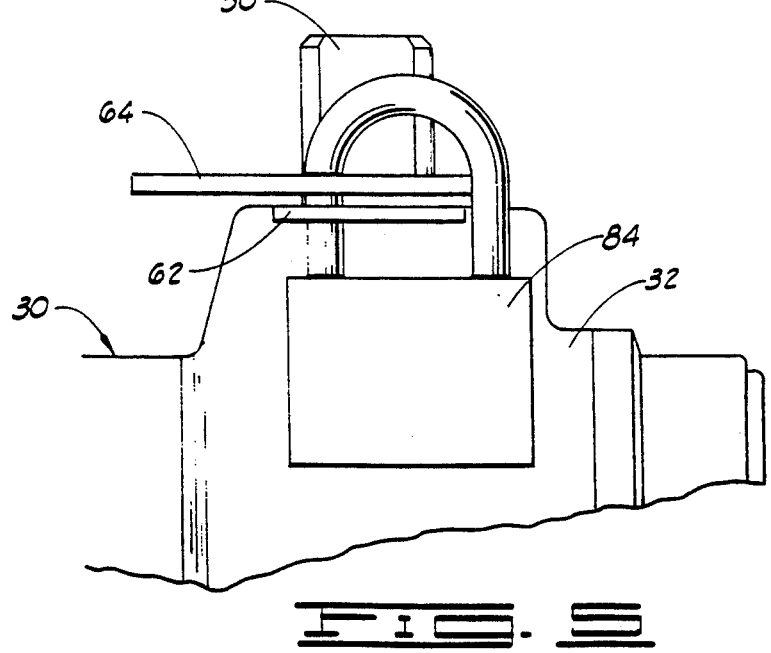

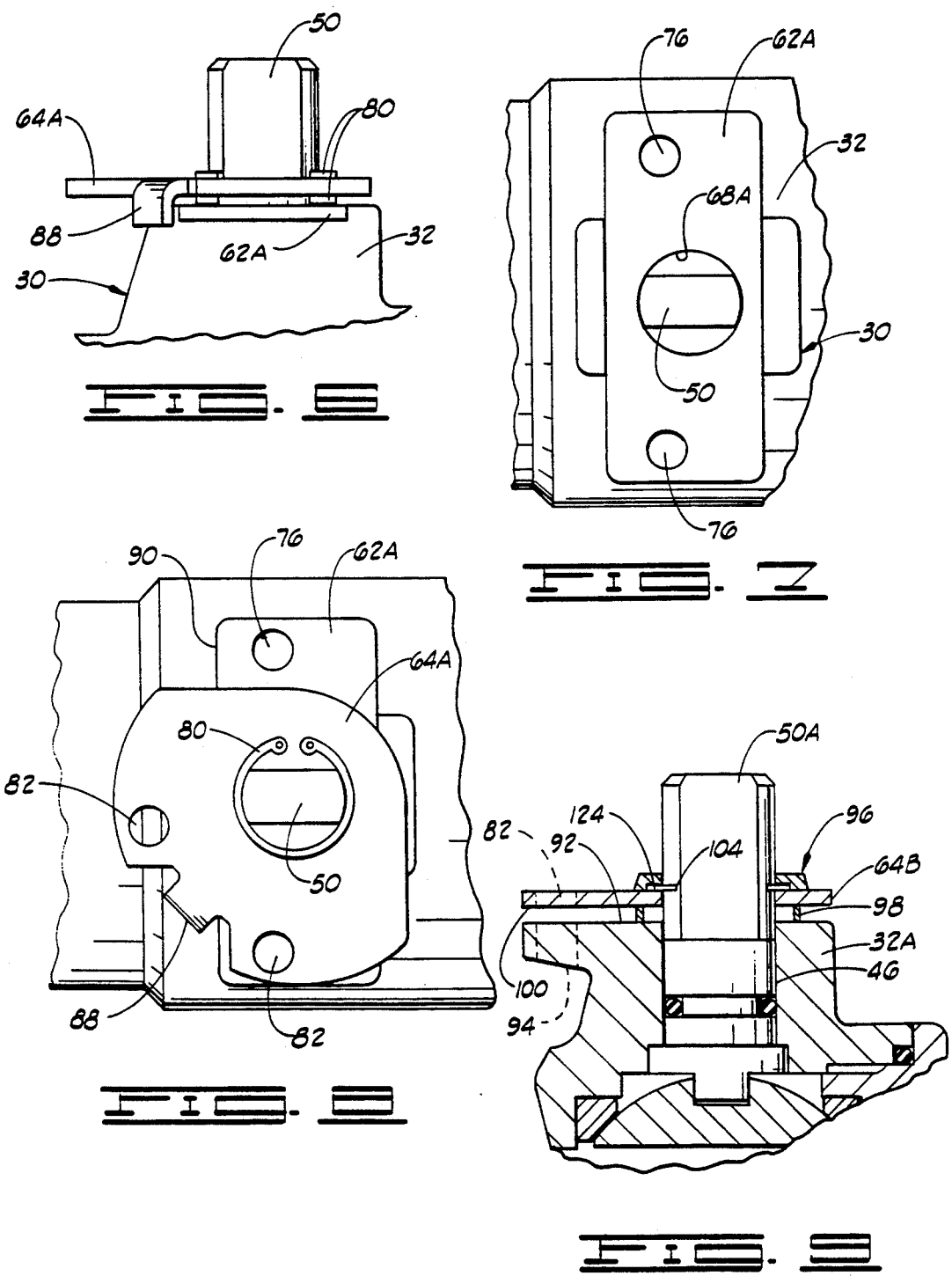

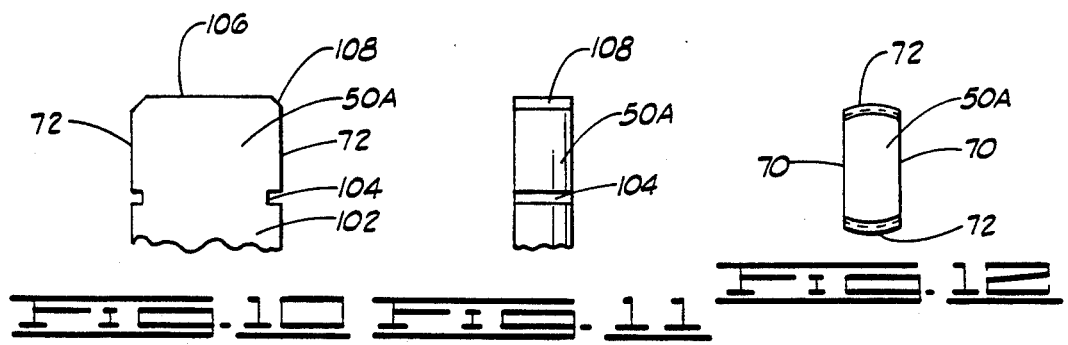
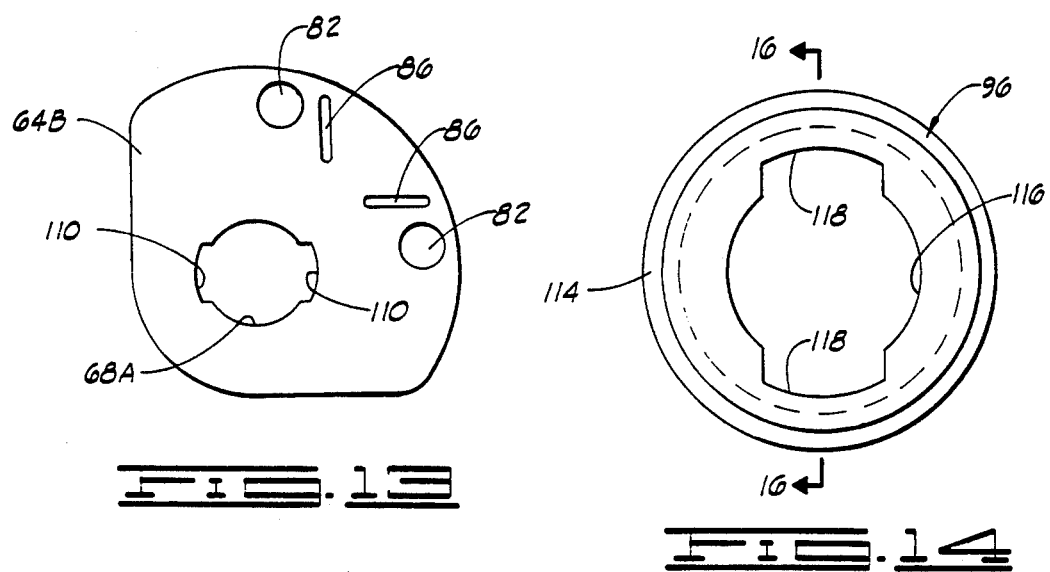
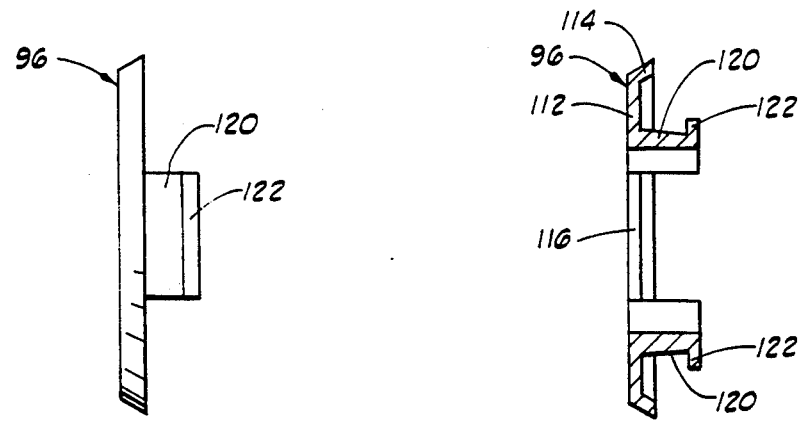

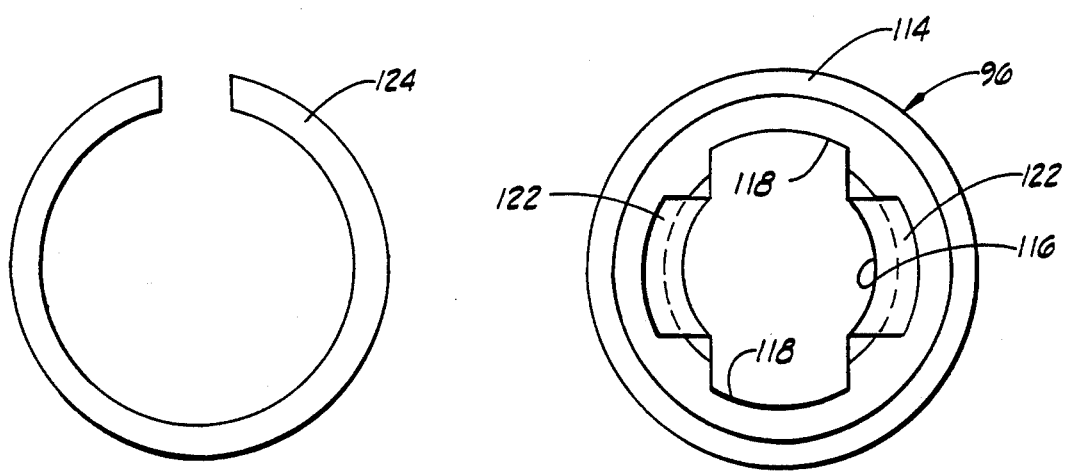
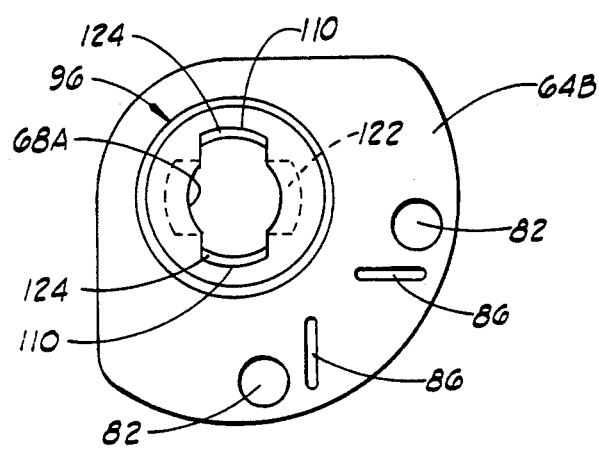
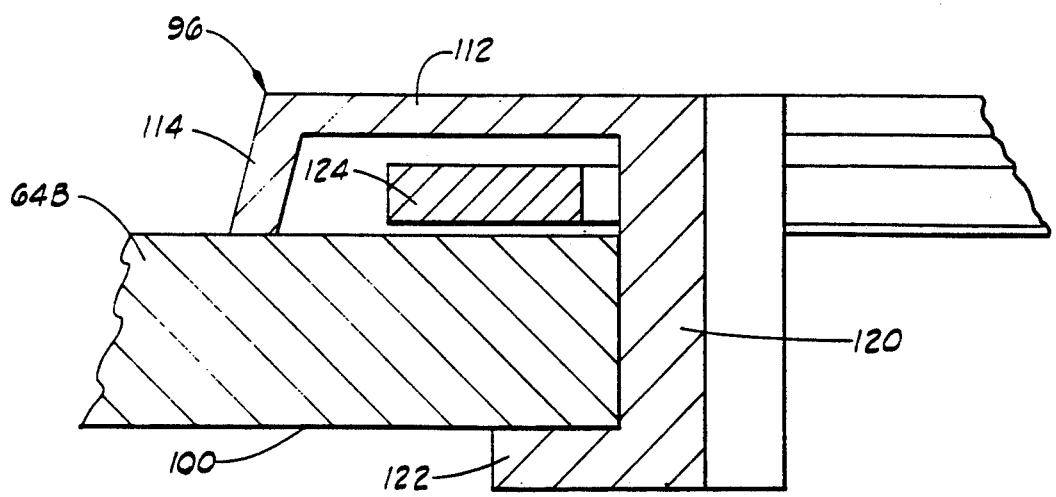

5,323,805

VALVE WITH SAFETY LOCK-OUT

FIELD OF THE INVENTION

This invention relates to improvements in valves of the type where the valve member is turned about 90° between fully open and fully closed positions, and more particularly, but not by way of limitation, such a valve with a safety lock-out when the valve is in a fully closed position.

BRIEF DESCRIPTION OF THE DRAWINGS

FIG. 3A is a cross-sectional view taken along lines 3—3 of FIG. 1 showing the valve stem in its position when the valve is open.

FIG. 3B is a view similar to FIG. 3A, showing the valve stem when the valve is closed.

FIG. 4 is a partial cross-sectional view showing a portion of the valve stem and an indexing plate.

FIG. 5 is a side view of a portion of a valve showing the valve in a locked-out condition.

FIG. 6 is a partial side view of a valve having an alternate form of safety lock-out.

FIG. 7 is a top view of the indexing plate of the type used with the system shown in FIG. 6.

FIG. 8 is a top view of the valve and lock-out system shown in FIG. 6.

FIG. 9 is a cross-sectional view of the top portion of a valve showing an alternate form of safety lock-out.

FIG. 10 is an isolated side view of the upper end portion of a valve stem used with the system shown in FIG. 9.

FIG. 11 is a side view taken at 90° from the view of FIG. 10 showing the upper portion of the valve stem.

FIG. 12 is a top view of the valve stem shown in FIGS. 10 and 11.

FIG. 13 is a plan view of the locking plate used with the system shown in FIG. 9.

FIG. 14 is an enlarged plan view of the security cover used for the valve shown in FIG. 9.

FIG. 15 is an enlarged side view of the security cover.

FIG. 16 is a cross-sectional view taken along lines 16—16 of FIG. 14.

FIG. 17 is a plan view of the split retainer ring used with the system shown in FIG. 9.

FIG. 18 is a bottom view of the security cover.

FIG. 19 is a top view of the lock-out plate and security cover assembled together ready for assembly on the valve stem shown in FIGS. 10, 11 and 12.

FIG. 20 is an enlarged, partial cross-sectional view through the central portion of the lock-out plate showing the assembly of the security cover on the lock-out plate.

DETAILED DESCRIPTION OF THE EMBODIMENTS SHOWN IN FIGS. 1-5

Figure 1:
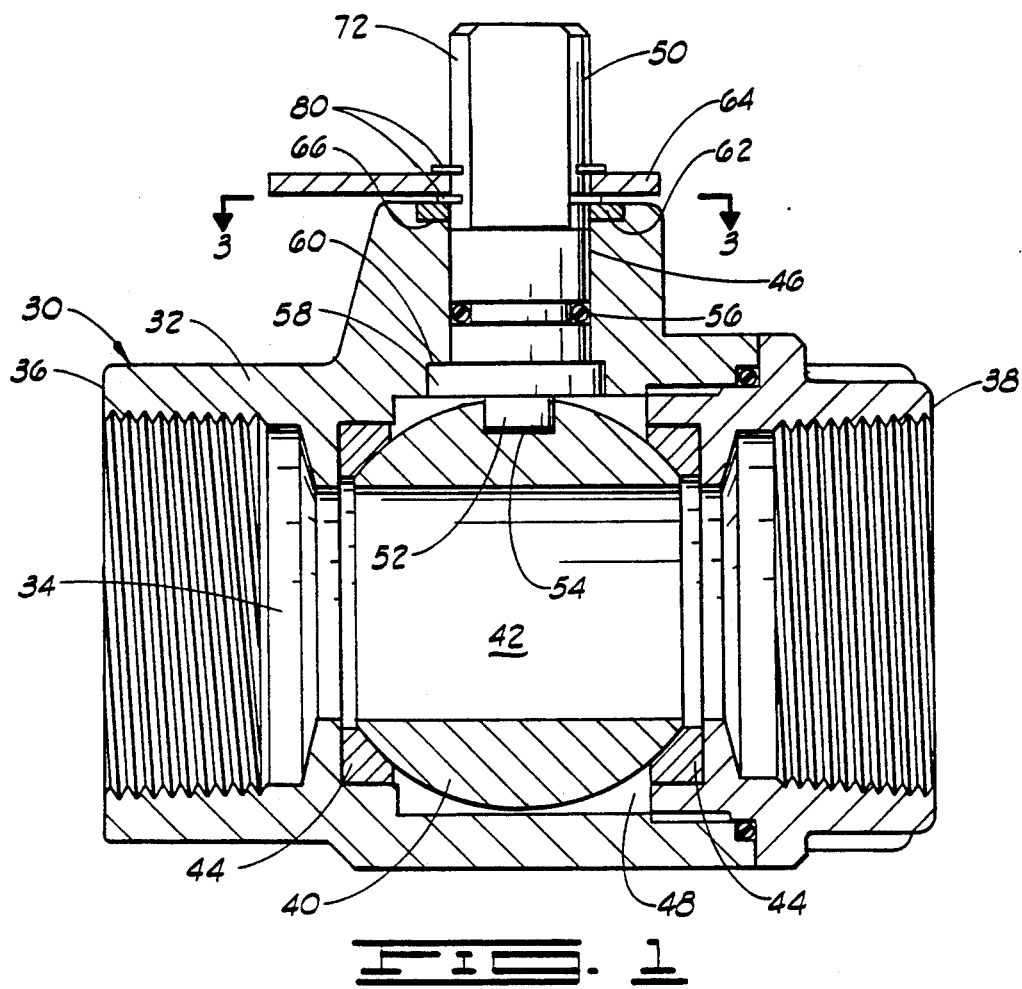
FIG. 1 is a cross-sectional view through a valve having one form of safety lock-out of this invention.
Figure 2:
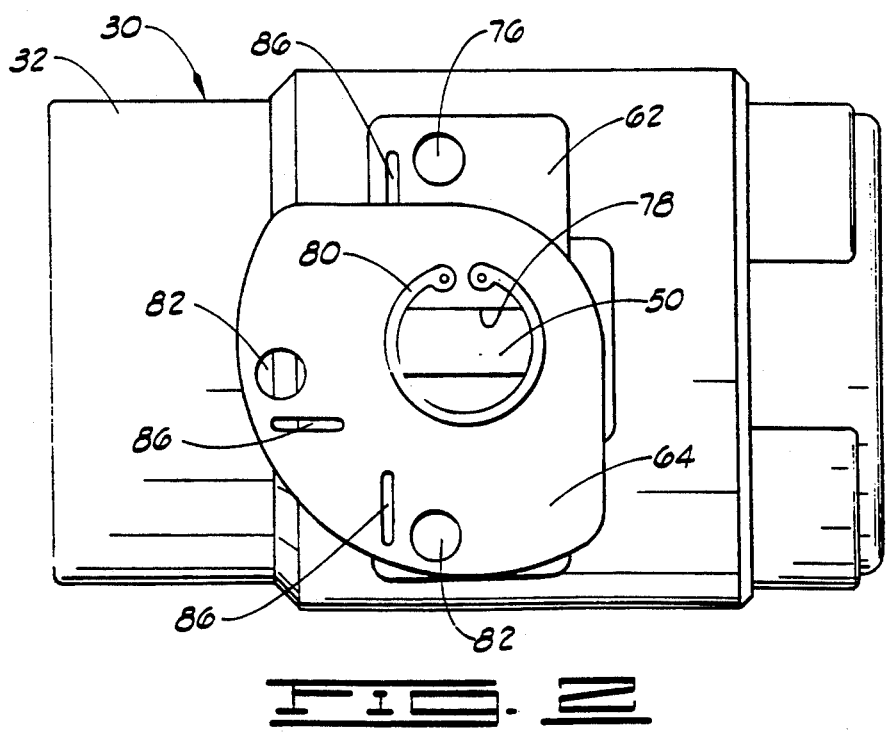
FIG. 2 is a top view of the valve shown in FIG. 1.

Referring to the drawings in detail, and particularly FIG. 1, reference character 30 generally designates a valve having one form of safety lock-out installed thereon. The valve 30 includes a valve body 32 having a bore 34 therethrough extending from the upstream end face 36 through the downstream end face 38 of the valve body for the passage of fluid therethrough. As shown, the valve 30 is of the screw-connection type for installation in a pipeline. The valve member 40 is in the form of a ball having an opening 42 therethrough to align with the bore 34 when the valve is in a fully open position. As is known in the art, when the ball 40 is turned 90°, the valve is in a fully closed position. Suitable valve seats 44 are mounted in the valve body to sealingly engage the opposite side of the ball 42 and help seal off the valve when the valve is fully closed.

The valve body 32 has an aperture 46 extending upwardly from the central portion 48, or valve chamber, of the valve through the valve body 32. The aperture 46 receives a valve stem 50 which has a key 52 on the lower end thereof fitting in a mating slot 54 in the ball 40 for turning the ball 40 when the valve stem 50 is turned. A suitable seal 56 fits in a mating groove around the central portion of the valve stem 50 to prevent leakage from the valve chamber 48 through the aperture 46 around the valve stem 50. The valve stem 50 is also provided with a flange 58 on the lower end portion thereof immediately above the key 52 which fits in a mating groove 60 of the valve body to prevent the valve stem 50 from being removed from the valve body through the aperture 46.

First and second plates 62 and 64, sometimes referred to herein as an indexing plate 62 and locking plate 64, are mounted on the valve stem 50 at the outer surface of the valve body 32. The indexing plate 62 is mounted in a mating recess 66 formed in the outer surface of the valve body 32 and is shown more in detail in FIGS. 3A and 3B. As shown in these figures, the indexing plate 62 is generally rectangularly shaped and has an aperture 68 through the central portion thereof to receive the valve stem 50. As also shown more specifically in these figures, the valve stem 50 has a pair of parallel, flat surfaces 70 which leave curved areas 72 on the outer surface of the valve stem between the flat surfaces 70. The aperture 68 in the indexing plate 62 has a pair of shoulders 74 projecting inwardly in the aperture positioned to engage the flat surfaces 70 of the valve stem 50 when the valve stem is turned either into the position shown in FIG. 3A or the position shown in FIG. 3B. The shoulders 74 are positioned to limit the turning movement of the valve stem 50 through 90° which positions the ball 40 in a fully open position as shogun in FIG. 1 when the valve stem 50 is in the position shown in FIG. 3A and to position the valve ball in a fully closed position when the valve stem 50 is in the position shown in FIG. 3B. The indexing plate 62 also has a pair of lock-out openings 76 generally located on opposite sides of the valve stem aperture 68 for purposes to be described.

The lock-out plate 64 has a valve stem aperture 78 therethrough shaped and sized to fit closely around the outer surface of the valve stem 50, such that when the valve stem 50 is turned, the lock-out plate 64 is also turned. The locking plate 64 is secured above the indexing plate 62 by means of a pair of split retainer rings 80 mounted in mating grooves in the curved portions 72 of the outer surface of the valve stem 50. Thus, the bottom surface of the lock-out plate 64 is adjacent to the flat surface provided by the indexing plate 62. It will also be noted that the lower split retainer ring 80 holds the indexing plate 62 in position in the mating recess 66 of the valve body 32.

The lock-out plate 64 has a pair of lock-out openings 82 formed therethrough essentially 90° apart with respect to the valve stem aperture 78. The lock-out openings 82 through the lock-out plate 64 are arranged to alternately mate with the lock-out openings 76 in the indexing plate 72 when the valve 30 is in a fully open or a fully closed position. With this arrangement, a suitable lock 84 may be inserted through mating lock-out openings 82 and 76 in the lock-out plate 64 and indexing plate 62 as shown in FIG. 5. A lock 84 is particularly useful to lock the valve 30 in a fully closed position to comply with governmental regulations. It may also be noted from FIG. 2 that the lock-out plate 64 and indexing plate 62 may be provided with slots 86 arranged to mate when the valve 30 is in a fully open or fully closed position to accommodate a suitable seal, rather than, or in addition to, a lock 84 as shown in FIG. 5. Thus, the safety lock-out system shown in the embodiment of FIGS. 1–5 provides an indexing of the valve to keep the valve from being moved beyond a fully open or a fully closed position, in addition to providing a structure whereby the valve may be secured in a fully open or a fully closed position.

DETAILED DESCRIPTION OF THE EMBODIMENT OF FIGS. 6–8

The system shown in FIGS. 6, 7 and 8 utilizes a slightly modified indexing plate 62A and slightly modified lock-out plate 64A. As shown in FIG. 7, the modified indexing plate 62A is constructed in the same manner as the indexing plate 62 previously described, except that the valve stem aperture 68A is completely circular to accommodate the valve stem 50; that is, the valve stem aperture in this embodiment does not utilize shoulders to engage the opposite sides of the valve stem 50.

The lock-out plate 64A is constructed in the same manner as the lock-out plate 64 previously described, except that the modified lock-out 64A has an indexing tab 88 located generally between the lock-out openings 82 and extending downwardly from the lock-out plate to engage sides of the indexing plate 62A when the lock-out plate 64A is turned from the fully open position to the fully closed position of the valve 30. Thus, a side 90 of the indexing plate 62A forms an abutment against which the indexing tab 88 is moved to the two desired operating positions of the valve 30. It will be understood that the lock-out openings 82 and the lock-out plate 64A are arranged to mate with the lock-out openings 76 of the indexing plate 62A when the valve is in the fully open or fully closed position in the same manner as described in connection with the previous embodiment, such that a lock or seal may be utilized to show the position of the valve.

DETAILED DESCRIPTION OF THE EMBODIMENT SHOWN IN FIGS. 9–20

As shown in FIG. 9, the valve body 32A is slightly modified to provide a flat outer surface 92 on the valve body surrounding the valve stem aperture 46, and at least one lock-out opening 94 is formed to communicate with the flat outer surface 92 at some distance from the valve stem aperture 46. The modified lock-out system shown in FIGS. 9–20 basically includes a modified lock-out plate 64B and a security cover generally designated by reference character 96. The modified lock-out plate 64B is secured on the valve stem 50A parallel with the flat surface 92, and a suitable dirt seal 98 is positioned around the valve stem 50A to sealingly engage the flat surface 92 of the valve body 32A and the bottom surface 100 of the modified locking plate 64B.

The outer end portion 102 of the slightly modified valve stem 50A is provided with a single groove 104 in the curved portions 72 of the valve stem. The groove 104 is spaced from the outer end 106 of the valve stem 50A a sufficient distance to accommodate a wrench which is used for opening and closing the valve. It will also be noted that the outer end 106 of the modified valve stem 50A has the sides thereof adjacent the curved surfaces 72 chamfered as shown at 108 for purposes to be described.

The modified lock-out plate 64B, shown in FIG. 13, is constructed in the same manner as the lock-out plate 64 previously described, except that the valve stem aperture 68A is essentially circular with notches 110 formed in diametrically opposed sides thereof. The notches 110 are sized to closely receive the curved surfaces 72 of the valve stem 50A when the modified locking plate 64B is installed as will be described hereinafter.

The security cover is shown enlarged in FIGS. 14, 15, 16 and 18 and comprises a flat plate portion 112 having a downturned rim 114 on the outer periphery thereof. A valve stem aperture 116 is provided through the plate portion 112 and conforms in size and shape to the valve stem aperture 68A of the locking plate 64B. That is, the valve stem aperture 116 of the security cover 96 is generally circular in configuration with diametrically opposed notches 118 formed therein. The notches 118 are of a size to fit around the curved portions 72 of the valve stem 50A when the security cover is installed as will be hereinafter described.

A pair of extensions 120 are provided on the lower surface of the plate portion 112. The extensions 120 are diametrically opposed and the outer periphery of each extension 120 is sized to engage the circular portions of the valve stem aperture 68A of the locking plate 64B when the security plate is installed, as will be described. A projection 122 is provided on the lower end of each extension 120 and extends radially outward from the valve stem aperture 116 of the security cap. The projections 122 are positioned to engage the lower surface of the locking plate 64B when the security cover is installed.

A split retainer ring 124 is shown in plan view in FIG. 17 and is sized to fit in the security cover 96 and extend into the groove 104 in the manner shown in FIG. 9 when the security cover is installed.

In assembling this embodiment of lock-out, the split retainer ring 124 is first placed in the security cover 96 within the downturn rim 114 as shown in FIG. 20. Then, the projections 122 and extensions 120 are inserted through the notches 110 of the locking plate 64B; whereupon the security cover 96 is turned 90° to position the projections 122 against the lower surface 100 of the locking plate 64B as indicated in FIGS. 19 and 20. With this subassembly, portions of the split retainer ring 124 project into the notches 110 of the locking plate 64B as also shown in FIG. 19. This subassembly is then placed over the outer end 106 of the valve stem 50A. The chamfers 108 on the valve stem function to assist the placement of the subassembly on the valve stem by urging the split retainer ring 124 outwardly into the security cover 96, such that the subassembly can be forced downwardly on the valve stem 50A until the split retainer ring 124 snaps inwardly into the groove 104. At this time, the locking plate subassembly is secured on the valve stem 50A against the dirt seal 98 as shown in FIG. 9.

In operation, one of the lock-out openings 82 in the locking plate 64B is arranged to mate with the lock-out opening 94 in the valve body 32A as indicated in FIG.

9 when the valve is in a fully closed position. If desired, an additional lock-out opening 94 may be provided in the valve body 32A to mate with the other lock-out opening 82 of the lock-out plate 64B, such that the valve may be locked in an open position.

It will also be understood, that the modified lock-out plate 64B and security cover 96, along with the split ring retainer 124 can be used with an indexing plate of the type shown in FIGS. 3A and 3B, if desired, such that both an indexing function and a lock-out function may be provided.

Changes may be made in the combination and arrangement of parts or elements as heretofore set forth in the specification and shown in the drawings without departing from the spirit and scope of the invention as defined in the following claims.

What is claimed is:

1. A valve comprising:
   a valve body having an upstream end face, a downstream end face, a bore extending therethrough intersecting the end faces, and an aperture formed therein intersecting the bore;
   a valve member disposed within the bore of said body intermediate the end faces and rotatable from a position wherein the bore is open to a position wherein the bore is closed;
   a valve stem journaled in the aperture of said valve body and connected at the inner end thereof to said valve member for rotation thereof;
   a first plate secured to the valve body having an aperture formed therethrough encircling the valve stem, and having at least one locking opening therethrough spaced from said aperture;
   a second plate secured on the valve stem parallel with said first plate to turn with the valve stem during opening and closing of the valve and having at least one locking opening therethrough positioned to mate with the locking opening in the first plate when the valve is in a fully closed position; and
   means on one of said plates for limiting the turning movement of the valve stem from a fully open position to a fully closed position and vice versa.

2. A valve as defined in claim 1 characterized further to include a second pair of locking openings in the first and second plates arranged to mate when the valve is in a fully open position.

3. A valve as defined in claim 1 wherein the valve stem has a pair of parallel flat surfaces formed on the outer end portion thereof; and
   wherein said means comprises a pair of diametrically opposed shoulders formed on the wall of the aperture in the first plate to engage the flat surfaces of the valve stem and limit the rotation thereof between fully open and fully closed positions of the valve.

4. A valve as defined in claim 1 wherein said means comprises an indexing tab on the second plate positioned to engage an edge of the first plate when the valve is in a fully closed position.

5. A valve as defined in claim 4 wherein said indexing tab is positioned to engage another edge of the first plate when the valve is in a fully open position.

6. A valve as defined in claim 1 wherein the valve body has an outer surface recessed around the valve stem, and wherein the first plate fits in said recess.

7. A valve as defined in claim 1 wherein the valve stem has a pair of parallel flat surfaces formed on the outer end portion thereof, and wherein the second plate has a valve stem opening therethrough receiving the valve stem, said valve stem opening having diametrically opposed notches therein receiving and fitting the curved sides of the valve stem between said parallel flat surfaces.

8. A valve as defined in claim 7 wherein the second plate has a top surface and a bottom surface, with the bottom surface facing the valve body, and characterized further to include:
   a retaining ring fitting in a mating groove formed around the valve stem adjacent the outer surface of the second plate holding the second plate in position on the valve stem; and
   a security cover secured on the valve stem covering the retainer ring.

9. A valve as defined in claim 8 wherein the security cover has a flat plate portion covering the retainer ring and a downturned rim surrounding the retainer ring.

10. A valve as defined in claim 9 characterized further to include a pair of diametrically opposed extensions on the flat plate portion of the security cover extending through the valve stem opening of the second plate; and
    a radially extending projection on the free end of each extension sized to engage the bottom surface of the second plate in one position of the security cover.

11. A valve as defined in claim 10 wherein said extensions on said radially extending projections are sized to be inserted through the notches in the second plate valve stem opening and then turned 90° to position the radially extending projections in engagement with the bottom surface of the second plate, with the security cover enclosing the retainer ring.

12. A valve comprising:
    a valve body having an upstream end face, a downstream end face, a bore extending therethrough intersecting the end faces, and an aperture formed therein intersecting the bore;
    said valve body having a flat outer surface surrounding said aperture and a locking opening in said flat outer surface parallel with said aperture and spaced radially from said aperture;
    a valve member disposed within the bore of said body intermediate the end faces and rotatable from a position wherein the bore is open to a position wherein the bore is closed;
    a valve stem journaled in the aperture of said valve body and connected at the inner end thereof to said valve member for rotation thereof, and having a pair of parallel flat surfaces formed on the outer end portion thereof;
    a locking plate on the valve stem having a bottom surface parallel with and adjacent said flat surface, and an opposite top surface;
    said locking plate having a valve stem aperture therethrough receiving the valve stem having diametrically opposed notches therein sized to mate with the curved sides of the valve stem located between said parallel flat surfaces, whereby the locking plate turns with a turning of the valve stem, said locking plate having a looking opening therein located to mate with the locking opening in said flat surface when the valve is in a fully closed position;
    a split retainer ring fitting a mating groove formed in the curved sides of the valve stem located between said parallel flat surfaces, said retainer ring engaging the top surface of the locking plate; and a security cover secured on the valve stem at the top surface of the locking plate shaped to cover said retainer ring.

13. A valve as defined in claim 12 wherein said security cover has a flat plate portion covering the retainer ring and a downturned rim surrounding the retainer ring.

14. A valve as defined in claim 12 characterized further to include a pair of diametrically opposed extensions on the flat plate portion of the security cover extending through the valve stem opening of the locking plate; and a pair of radially extending projections on the free end of each extension positioned to engage the bottom surface of the locking plate in one position of the security cover.

15. A valve as defined in claim 14 wherein said extensions on the radially extending projections are sized to be inserted through the notches in the locking plate valve stem opening and then turned 90° to position the radially extending projections in engagement with the bottom surface of the locking plate, with the security cover enclosing the retainer ring.

16. A valve as defined in claim 12 characterized further to include:

a dust seal around the valve stem sealingly engaging the bottom surface of the locking plate and said flat surface on the valve body.

17. A valve as defined in claim 12 characterized further to include:

an indexing tab on the locking plate positioned to engage an abutment on the valve body when the valve is in a fully closed position.

* * * * *